United States Patent Office 2,938,589
Patented May 31, 1960

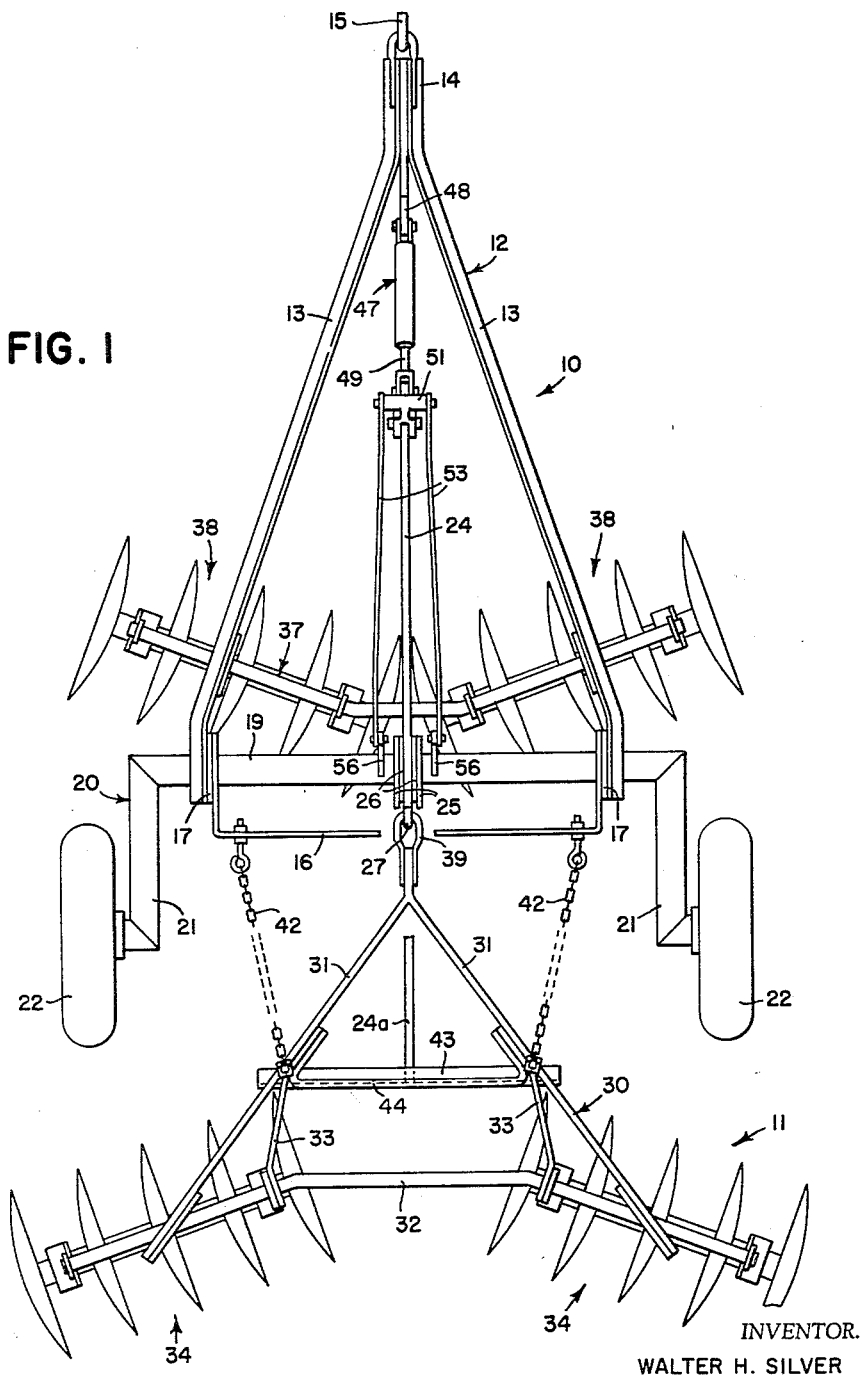

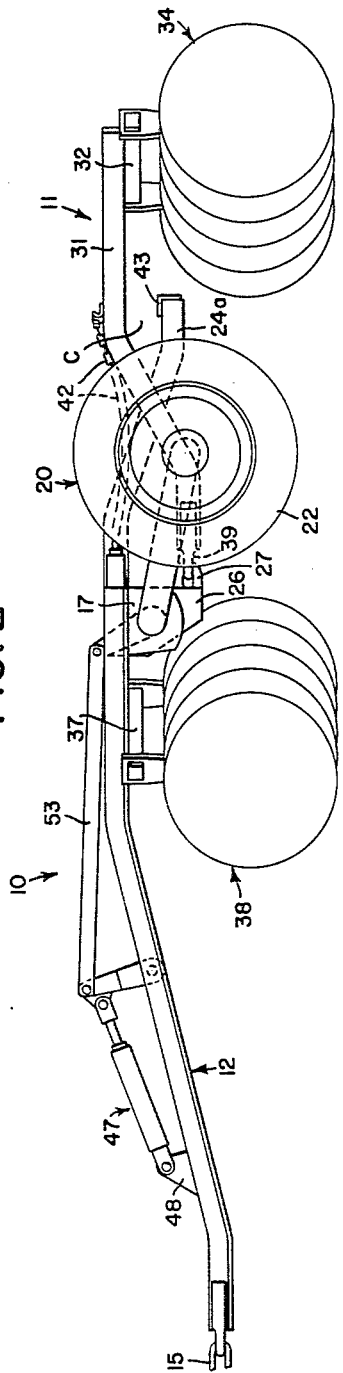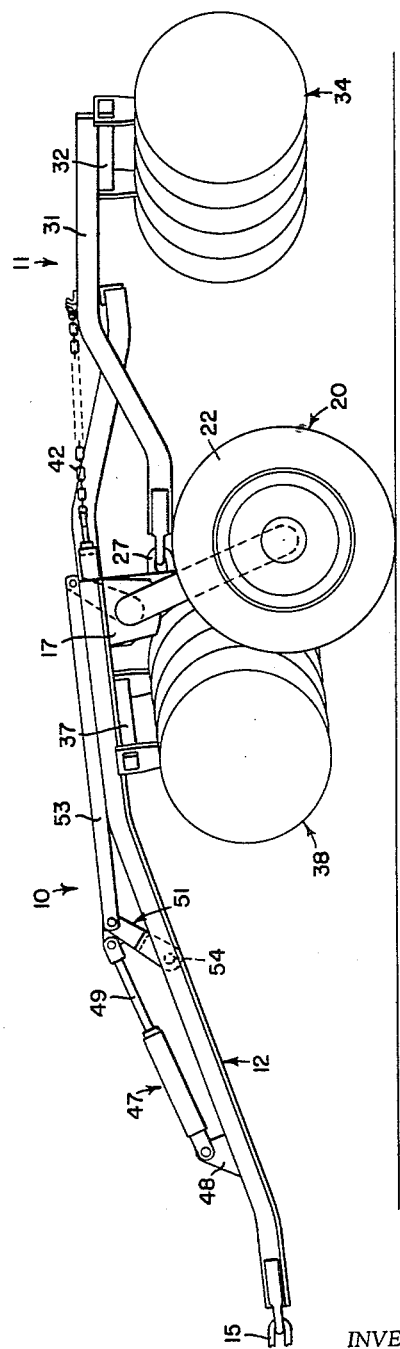

2,938,589

WHEEL TYPE DISK HARROW

Walter H. Silver, Moline, Ill., assignor, by mesne assignments, to Deere & Company, a corporation of Delaware Filed June 3, 1957, Ser. No. 663,187

5 Claims. (Cl. 172—413)

The present invention relates generally to agricultural implements and more particularly to ground working implements such as disk harrows and the like.

The object and general nature of the present invention is the provision of a new and improved tandem wheel type disk harrow in which front and rear units are swivelly interconnected so that the implement is quite flexible in operation, with a ground engaging wheel unit swingable relative to the front unit of the disk harrow so as to raise the latter into and out of transport and operating positions, and with means for automatically raising the rear unit into a transport position when the wheel unit raises the front harrow unit.

More specifically, it is a feature of this invention to provide a simplified tandem wheel type disk harrow, consisting principally of a front frame and a rear frame normally interconnected for both vertical and lateral swinging movement, more or less independent of one another, the front frame including a part that engages and raises the rear frame whenever the front frame is raised into a transport position, as by a wheel frame that is connected with the front frame.

These and other objects and advantages of the present invention will be apparent to those skilled in the art after a consideration of the following detailed description of the preferred embodiment, taken in conjunction with the accompanying drawings, in which:

Fig. 1 is a plan view of the tandem wheel type disk harrow in which the principles of the present invention have been incorporated.

Fig. 2 is a side view of the implement shown in Fig. 1, with the disk gangs in working position.

Fig. 3 is a side view similar to Fig. 2, showing the disk harrow in a transport or non-working position.

Referring now to the drawings, particularly Fig. 1, the disk harrow of the present invention comprises a front unit 10 and a rear unit 11 suitably interconnected together, as will be explained below, so that in operation the rear unit 11 may swing laterally or vertically, or any combination of lateral and vertical movement, within limits, relative to the front unit 10. The latter unit includes a frame 12 that is made up of a pair of angles 13 connected together at the forward ends to form hitch means 14 by which the implement may be connected to a propelling tractor, represented by the tractor drawbar 15. The angles 13 diverge rearwardly and are interconnected by a generally U-shaped cross bar 16, the forwardly extending ends of which are connected to the rear ends of the angles 13 by any suitable means, which also secure a pair of depending brackets 17 to the frame 12. The brackets 17 are apertured and rockably receive a transverse shaft 19 that forms a part of the wheel-carrying crank axle or wheel frame 20. The latter unit includes downwardly and rearwardly extending arms 21 to the outer end of which ground engaging wheels 22 are journaled. The frame 12 also includes a generally rearwardly extending bar 24 located centrally and carrying brackets 25 that are similar to brackets 17, together with additional brackets 26 to which a yoke 27 is fixed.

The frame of the rear unit 11 is indicated in its entirety by the reference numeral 30 and includes a pair of rigidly interconnected divergent bars 31 suitably interconnected to a rear transverse bar 32 and re-enforced by a pair of braces 33. The end portions of the rear cross bar 32 are bent laterally and rearwardly and rigidly receive a pair of disk gangs 34. A bar 37, similar to the bar 32, is connected to the angles 13 and forms a part of the front frame 12, the end portions of the bar 37 being bent so as to extend outwardly and forwardly, which end portions receive a pair of front disk gangs 38. The forward or apical portion of the rear frame 30 is connected by means of a clevis 39 with the yoke 27, the connection being such that the rear frame normally has generally universal movement relative to the front frame 10. Excessive lateral swinging is, however, prevented by means of a pair of normally slack chains 42 that are connected between the outer end portions of the cross bar 16 and intermediate points of the rearwardly diverging rear frame bars. These chains become taut when the implement is raised into transport, as shown in Fig. 3.

The generally central frame bar 24 of the front frame 12 extends rearwardly beyond the disk gangs 38 and the associated wheel frame 20, as indicated at 24a, Figs. 1 and 2, and the rear end of the bar section 24a carries a cross angle 43 that lies underneath the frame 30 with considerable clearance, indicated by the reference character C in Fig. 2, when the disk harrow is in operating position. A cross bar 44 is carried by the frame 30 so as to overlie the angle 43, and thus ensures support of the frame 30 on the bar 43, even though the frame 30 is swung laterally.

The wheel frame or wheel unit 20 is utilized as means for raising and lowering both front and rear gangs into and out of transport and working positions. A power cylinder 47 is connected at its forward end to a bracket 48 on the front frame 12, and the piston rod 49 of the unit 47 is connected to a swinging lever 51 carried by the forward portion of the central frame bar 24. A pair of push bars 53 are connected between the upper portion of the lever 51, which is pivotally mounted, as at 54, on the frame 12, with a pair of arms 56 fixed to the transverse rockshaft 19 of the wheel frame 20.

In operation, the wheel frame 20 is swung into the position shown in Fig. 2 by retraction of the power cylinder 47. The latter is a two-way or double acting hydraulic ram, the associated hose line being omitted for purposes of clarity. It will be understood, of course, that the power unit 47 is adapted to be operated from the tractor. When the wheel frame 20 is raised into the position shown in Fig. 2, its weight is added to the weight of the frame 12 so that penetration of the front disks 38 is assured. If the penetration should be greater than desired, the wheel frame 20 may be lowered until the wheels 22 run along the surface of the ground and serve to take a part of the weight off the front gangs 38. By virtue of the clearance C and the slackness in the chains 42, the rear unit 11 may swing laterally or vertically, or any combination of such movements, relative to the front unit 10 so as to accommodate working uneven ground.

The implement is raised into its inoperative or transport position by swinging the wheel frame 20 downwardly until the entire harrow is supported on the wheels 22, being substantially balanced thereon, with only a small portion of the weight at the front carried on the tractor drawbar 15. When the wheel frame is initially lowered, it will be seen that the front unit 10 is raised until the bar 43 comes up into engagement with the bars 31 of the rear frame 30. Thereafter, continuous downward swinging of the wheel unit 20 serves to lift the rear unit 11 off the ground until at the end of the raising action, the parts take the positions shown in Fig. 3, with the rear disk gangs 34 supported above the ground about the same amount as the front gangs 38.

While I have shown and described above the preferred structure in which the principles of the present invention have been incorporated, it is to be understood that my invention is not to be limited to the particular details, shown and described above, but that, in fact, widely different means may be employed in the practice of the broader aspects of my invention.

What I claim, therefore, and desire to secure by Letters Patent is:

1. A tandem wheel type disk harrow, comprising separate front and rear units, each including a disk gang, means connecting said units for generally universal movement, one relative to the other, means rigid with the forward unit underlying a portion of the rear unit, and a ground wheel unit movably connected with the front unit for raising the latter and, after said rigid means engages the rear unit, also raising the rear unit.

2. A tandem wheel type disk harrow, comprising separate front and rear units, each including a disk gang, means connecting said units for generally universal movement, one relative to the other, means rigid with the forward unit underlying a portion of the rear unit, there being space between said rigid means and the rear unit when the front and rear gangs are in soil working position, whereby the rear unit may swing generally vertically relative to the front unit, and a ground wheel unit movably connected with the front unit for raising the latter and, after said rigid means engages the rear unit, also raising the rear unit.

3. A tandem wheel type harrow comprising a pair of front and rear units, each having ground working means, means to raise and lower the rear portion of the front unit; comprising a wheel frame swingable relative to the rear portion of the front unit and extending downwardly and rearwardly therefrom rearwardly of the front ground working means, a bar fixed to the front unit and extending rearwardly to a point underneath the rear unit for lifting the latter when the front unit is raised, and means swivelly connecting the rear unit with the front unit to accommodate lateral and vertical movement of the rear unit relative to the front unit when the latter is lowered into operating position.

4. A tandem wheel type harrow comprising a pair of front and rear units, each having ground working means, means to raise and lower the rear portion of the front unit, comprising a wheel frame swingable relative to the rear portion of the front unit and extending downwardly and rearwardly therefrom rearwardly of the front ground working means, a bar fixed to the front unit and extending rearwardly to a point underneath the rear unit, a transverse member fixed to the end of said rearwardly extending bar and located so as to engage laterally spaced apart portions of the rear unit for lifting the latter when the front unit is raised, and means swivelly connecting the rear unit with the front unit to accommodate lateral and vertical movement of the rear unit relative to the front unit when the latter is lowered into operating position.

5. The invention defined in claim 4, further characterized by said rear unit including frame means that includes a transverse bar located to overlie said transverse member when the rear unit is displaced laterally relative to the front units.

References Cited in the file of this patent
UNITED STATES PATENTS

| | | |
|---|---|---|
| 2,336,410 | McKay | Dec. 7, 1943 |
| 2,398,147 | McKay | Apr. 9, 1946 |
| 2,765,609 | Oehler et al. | Oct. 9, 1956 |
| 2,787,105 | Witwer | Apr. 2, 1957 |